UNITED STATES PATENT OFFICE.

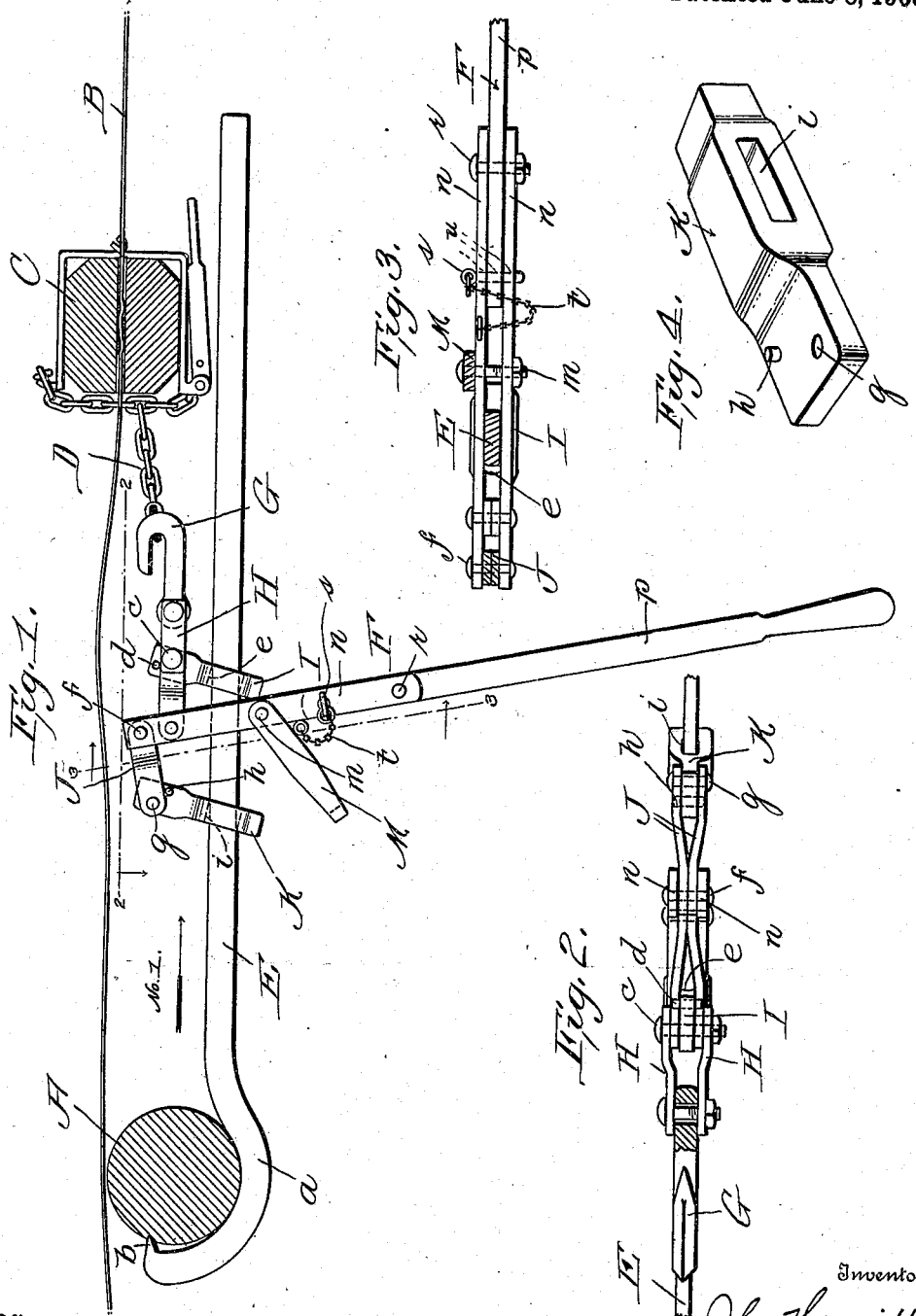

JOHN C. HEWITT, OF ATHENS, OHIO.

WIRE-FENCE STRETCHER.

No. 923,843.        Specification of Letters Patent.        Patented June 8, 1909.

Application filed January 25, 1909. Serial No. 474,061.

*To all whom it may concern:*

Be it known that I, JOHN C. HEWITT, citizen of the United States, residing at Athens, in the county of Athens and State of Ohio, have invented new and useful Improvements in Wire-Fence Stretchers, of which the following is a specification.

My invention has to do with means for stretching woven-wire fences; and one of the objects of the invention is to provide a stretcher adapted to be quickly and easily connected with a fence or the like to be stretched, and a post, and embodying such a construction that an operator is enabled with the expenditure of little effort to strongly pull and stretch the fence, and no effort on the part of the operator is necessary to hold the fence against retrograde movement or casual loosening.

Another object of the invention is the provision of a stretcher, of the kind stated, embodying means whereby the stretched fence may be expeditiously and easily relieved of the draft or pull as when it is desired to disconnect the stretcher from the fence and the post.

With the foregoing in mind the invention will be fully understood from the following description and claims when the same are read in connection with the drawings, accompanying and forming part of this specification, in which:

Figure 1 is a horizontal section taken in a plane above the stretcher constituting the best practical embodiment of my invention of which I am cognizant, and showing the said stretcher as connected with and properly arranged relative to a woven-wire fence to be stretched and a post alongside which the fence passes. Fig. 2 is an enlarged detail view, taken in the plane indicated by the line 2—2 of Fig. 1, looking in the direction indicated by the arrow, and showing the connection between the hook and the hand lever and the connections between the clutches and the said hand lever. Fig. 3 is an enlarged detail section taken in the plane indicated by the line 3—3 of Fig. 1, and best showing the sectional construction of the hand lever and the means for permitting of the said lever being folded when not in use. Fig. 4 is a perspective view, on an enlarged scale, of the clutch shown at the left of the lever in Fig. 1, as said clutch appears when removed from the stretcher.

Similar letters designate corresponding parts in all of the views of the drawings, referring to which:

A is a fence post.

B is a woven-wire fence.

C is an upright grip constructed by preference in the manner set forth in detail in my contemporary application of even date herewith, Serial Number 474,060 and fixed upon the fence B and having the usual chain or cable D for the connection of a stretcher, and E is the draft bar comprised in my novel stretcher. The said draft bar E is provided at its forward end with a hook $a$ which is designed to reach around the post A to the forward side thereof, and is there provided with a barb or prod $b$, designed, when pull is exerted on the bar in the direction indicated by the arrow No. 1, to be embedded in the post and in that way assure the bar remaining alongside the fence B, as illustrated in Fig. 1.

In addition to the bar E, my novel stretcher comprises a hand lever F which straddles the bar, a hook G designed to engage the chain or cable D on the grip C, links H pivotally connected to the hook G and to the short arm of the lever F, a clutch I pivoted at $c$ between the links H, and having a stop $d$ adapted to bring up against that edge of the upper link H which is adjacent the fence, and also having an opening $e$ which receives the bar E, links J pivoted at $f$ to the short arm of the lever F and extending in the opposite direction from said short arm, with reference to the links H, and a clutch K pivoted at $g$ between the links J and having a stop $h$ and also having an aperture $i$, which latter receives the draft bar E in the manner shown.

By virtue of the construction described, it will be manifest that when the lever F is oscillated subsequent to the connection of the bar E to the post A, and the connection of the hook G to the chain or cable D, the clutches I and K will creep step by step on the bar E in the direction opposite to that indicated by the arrow No. 1, and first one and then the other of the said clutches will take secure hold of the bar E, with the result that the fence B will be strongly pulled in the direction desired, and will be effectually prevented from casually moving backward or becoming loose. It will also be manifest that the stretching of the fence through the medium of the mechanism described may be accomplished with but little effort on the part of the attendant who manipulates the lever F, and that retrograde movement of the fence is prevented without entailing any effort whatever on the part of the attendant.

When it is desired after the fence has been stretched and secured to the post A or otherwise, to permit the clutches I and K to move on the bar E in the direction of the arrow No. 1, to permit of the hook G being easily disconnected from the chain or cable D, the clutches may be rendered loose on the bar E by first placing the end of the swinging hook M over the adjacent end of the clutch K, and then swinging the lever F forcibly against the adjacent end of the clutch I, since by such operation both clutches will be simultaneously moved to positions at right angles to the bar E. In this connection it will be noticed that the hook M is pivoted at $m$ to the lever F and is adapted to move with said lever.

In the present and preferred embodiment of my invention the lever F comprises bars $n$ adapted to rest above and below the bar E, a handle bar $p$ which is pivoted at $r$ between the bars $n$, and a pin $s$ which is connected through a chain $t$ with one of the bars $n$, and is designed when the handle bar $p$ is alined with the bars $n$ to be placed in registered apertures $u$ in the three bars, see dotted lines in Fig. 3. Because of this connection it will be manifest that the bars $n$ and the handle bar $p$ may be moved as one piece, and yet when it is not desired to use the stretcher, the pin $s$ may be withdrawn from the apertures $u$, and then the handle bar $p$ may be swung on the pin $r$ so as to render the stretcher as a whole more compact.

It will be readily gathered from the foregoing that my novel stretcher is adapted to be easily applied and operated, and that it is well adapted to withstand exposure to the weather and the rough usage to which devices of corresponding character are ordinarily subjected.

As before stated, the construction herein shown and described is the best practical embodiment of my invention that I have devised, but it is understood that in the future practice of the invention changes in the form, construction and relative arrangement of parts may be made within the spirit of my invention as defined in my claims appended.

Having described my invention, what I claim and desire to secure by Letters-Patent, is:

1. In a wire stretcher, the combination of a draft bar, a hand lever extending at an angle to and straddling said draft bar and having long and short arms, apertured clutches receiving the bar and arranged at opposite sides of the lever and connected with the short arm of the lever, and means on the long arm of the lever adapted to effect detachable connection between one of the clutches and said long arm of the lever when it is desired to utilize the lever to simultaneously move both clutches to positions at approximate right angles to the draft bar.

2. In a wire stretcher, the combination of a bar, a hand lever extending at an angle to and straddling said bar and having long and short arms, links pivoted to and extending in opposite directions from the short arm of the lever, and clutches pivoted to the links and disposed at opposite sides of the lever and having apertures receiving the bar and also having stops for coöperating with their respective links, and means connected with one of the links and arranged at the opposite side of one of the clutches, with reference to the lever, and adapted for use in the connection of the stretcher to the thing to be stretched.

3. In a wire stretcher, the combination of a bar, a hand lever extending at an angle to and straddling said bar and having long and short arms, links pivoted to and extending in opposite directions from the short arm of the lever, clutches pivoted to the links and disposed at opposite sides of the lever and having apertures receiving the bar and also having stops for coöperating with their respective links, and a swinging hook connected with the long arm of the lever and adapted to be moved into and out of engagement with one of the clutches, for the purpose set forth.

4. In a wire stretcher, the combination of a draft bar, a hand lever straddling said draft bar, apertured clutches receiving the bar and arranged at opposite sides of the lever and connected with the same, and means adapted to effect detachable connection between one of the clutches and the lever when it is desired to utilize the lever to simultaneously move both clutches to positions at approximate right angles to the draft bar.

In testimony whereof I have hereunto set my hand in presence of two subscribing witnesses.

JOHN C. HEWITT.

Witnesses:
 JAS. H. BLACKWOOD,
 T. E. TURPIN.